US012125281B2

(12) United States Patent
Derbisz

(10) Patent No.: US 12,125,281 B2
(45) Date of Patent: Oct. 22, 2024

(54) DETERMINING DISTANCE OF OBJECTS

(71) Applicant: Aptiv Technologies AG, Schaffhausen (CH)

(72) Inventor: Jakub Derbisz, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 333 days.

(21) Appl. No.: 17/650,662

(22) Filed: Feb. 10, 2022

(65) Prior Publication Data

US 2022/0270371 A1    Aug. 25, 2022

(30) Foreign Application Priority Data

Feb. 19, 2021  (EP) .................................... 21158089

(51) Int. Cl.
*G06V 20/50* (2022.01)
*G06V 10/764* (2022.01)
*G06V 10/82* (2022.01)

(52) U.S. Cl.
CPC ............ *G06V 20/50* (2022.01); *G06V 10/764* (2022.01); *G06V 10/82* (2022.01)

(58) Field of Classification Search
CPC ...... G06V 20/50; G06V 10/764; G06V 10/82; G06V 20/58; G06F 18/214; G06N 3/045; G06N 3/08
USPC ....................................................... 382/103
See application file for complete search history.

(56) References Cited

U.S. PATENT DOCUMENTS

| | | | | |
|---|---|---|---|---|
| 2009/0103779 A1* | 4/2009 | Loehlein | ............... | G06V 10/147 382/103 |
| 2010/0215254 A1* | 8/2010 | Prokhorov | ............. | G06V 20/58 340/995.28 |
| 2012/0212366 A1* | 8/2012 | Alalusi | ................... | G01S 13/36 342/118 |
| 2016/0062949 A1* | 3/2016 | Smith | ................... | H04W 4/029 702/150 |
| 2017/0284839 A1* | 10/2017 | Ojala | ...................... | H04L 67/12 |
| 2018/0032170 A1* | 2/2018 | Shaik | ....................... | G06F 3/017 |
| 2018/0217966 A1* | 8/2018 | Buttolo | ................... | H04L 67/12 |
| 2019/0178987 A1* | 6/2019 | Ikram | ................... | G01S 13/931 |
| 2020/0265229 A1* | 8/2020 | Badr | ........................ | G06T 7/248 |
| 2021/0366144 A1* | 11/2021 | Magistri | ................ | G06V 20/56 |

OTHER PUBLICATIONS

Ding Meng et al: "Vision-Based Distance Measurement in Advanced Driving Assistance Systems", Applied Sciences, vol. 10, No. 20, Oct. 17, 2020, (Oct. 17, 2020), p. 7276, XP055796220, DOI: 10.3390/app10207276.*

(Continued)

*Primary Examiner* — Mahendra R Patel
(74) *Attorney, Agent, or Firm* — Harness, Dickey & Pierce, P.L.C.

(57) ABSTRACT

A computer implemented method for determining a distance of an object comprises the following steps carried out by computer hardware components: determining an image containing the object; determining a class of the object based on the image; determining a coarse estimation of the distance based on a distance sensor; and determining the distance of the object based on the coarse estimation and based on the class of the object.

17 Claims, 6 Drawing Sheets

(56) References Cited

OTHER PUBLICATIONS

Ramin Nabati et al: "Radar-Camera Sensor Fusion for Joint Object Detection and Distance Estimation in Autonomous Vehicles", arxiv.org, Cornell University Library, 201 Olin Library Cornell University Ithaca, NY 14853, Sep. 17, 2020 (Sep. 17, 2020), XP081765383.*
"Extended European Search Report", EP Application No. 21158089.9, Jul. 19, 2021, 6 pages.
Bochkovskiy, et al., "YOLOv4: Optimal Speed and Accuracy of Object Detection", Apr. 23, 2020, 17 pages.
Caesar, et al., "nuScenes: A Multimodal Dataset for Autonomous Driving", May 5, 2020, 16 pages.
Ding, et al., "Vision-Based Distance Measurement in Advanced Driving Assistance Systems", Applied Sciences 10, No. 20: 7276, Oct. 17, 2020, 19 pages.
Godard, et al., "Digging Into Self-Supervised Monocular Depth Estimation", Aug. 17, 2019, 18 pages.
Guizilini, et al., "3D Packing for Self-Supervised Monocular Depth Estimation", Mar. 28, 2020, 13 pages.
Lang, et al., "PointPillars: Fast Encoders for Object Detection from Point Clouds", May 7, 2019, 9 pages.
Liang, et al., "Multi-Task Multi-Sensor Fusion for 3D Object Detection", Dec. 22, 2020, 11 pages.
Liu, et al., "SSD: Single Shot MultiBox Detector", Dec. 29, 2016, 17 pages.
Maneewongvatana, et al., "It's okay to be skinny, if your friends are fat", Dec. 18, 1999, 8 pages.
Nabati, et al., "Radar-Camera Sensor Fusion for Joint Object Detection and Distance Estimation in Autonomous Vehicles", Jul. 17, 2020, 6 pages.
Redmon, et al., "YOLO9000: Better, Faster, Stronger", Dec. 25, 2016, 9 pages.
Redmon, et al., "YOLOv3: An Incremental Improvement", Apr. 8, 2018, 6 pages.
Redmon, et al., "You Only Look Once: Unified, Real-Time Object Detection", May 9, 2016, 10 pages.
Zhou, et al., "VoxelNet: End-to-End Learning for Point Cloud Based 3D Object Detection", Nov. 17, 2017, 10 pages.

* cited by examiner

DETERMINING DISTANCE OF OBJECTS

CROSS-REFERENCE TO RELATED APPLICATION

This application claims priority to European Patent Application Number 21158089.9, filed Feb. 19, 2021, the disclosure of which is hereby incorporated by reference in its entirety herein.

BACKGROUND

The present disclosure relates to methods and systems for determining a distance of an object. Being aware of distances to the objects around the vehicle is an important aspect for (at least partially) autonomously driving vehicles.

Accordingly, there is a need to provide efficient and reliable methods and systems for determining distances to the objects around the vehicle.

SUMMARY

The present disclosure provides a computer-implemented method, a computer system, and a non-transitory computer-readable medium.

In one aspect, the present disclosure is directed at a computer-implemented method for determining a distance of an object, the method comprising the following steps performed (in other words: carried out) by computer hardware components: determining an image containing (in other words: showing) the object; determining a class of the object based on the image; determining a coarse estimation (in other words: coarse estimate) of the distance based on a distance sensor; and determining the distance of the object based on the coarse estimation and based on the class of the object.

The distance may be a scalar distance or a vector with more than one component (for example, a two-dimensional or three-dimensional vector, so that the distance may be used for determining a location in a two-dimensional or three-dimensional space relative to the ego vehicle on which the sensor is provided).

Determining the class may be understood as classifying the object based on the image into one of a plurality of classes.

For example, a technique for constructing a distance-oriented objects description using ML (machine learning) model training and re-projection of objects of interest imaged in 2D camera view onto the BEV (bird's eye view) coordinate system with distance compensation corrections may be provided.

A real-time object detection system which may be applied in a self-driving car may be provided. This system may detect many object classes at once and may provide their localization with respect to distance between themselves and the ego vehicle. Description of an environment with positional knowledge of reprojected plane-based detected objects may be provided.

According to another aspect, the class of the object is selected from a plurality of traffic participant types. The traffic participant types may be selected so that all objects of a specific type have a similar size.

According to another aspect, the plurality of traffic participant types comprise pedestrian, and/or bicycle, and/or car, and/or truck.

According to another aspect, the class of the object is selected from a plurality of orientations.

According to another aspect, the plurality of orientations comprises left, and/or upper-left, and/or upper, and/or upper right, and/or right, and/or bottom-right, and/or bottom, and/or bottom-left.

For example, a method for correction vectors construction from training classes assignment may be provided. The object classes may be semantically related, and/or size (for example, width and height) related, and/or orientation specific (for example with granularity: bottom, bottom-left, left, upper-left, up, upper-right, right, bottom-right).

According to another aspect, the class may be determined using a machine learning method, for example, an artificial neural network. The training method of the machine learning method (for example, artificial neural network) may allow accurate reprojection of detected classes.

According to another aspect, the artificial neural network may be an SSD (single shot detector) type or a YOLO (you only look once) type. It is understood that YOLO method is one of SSD type methods. The method for training of SSD type (or YOLO type) neural network may allow accurate reprojection of image detections to get BEV positional knowledge between objects. Machine learning models of SSD type (or YOLO type) may be trained on images only. It has been found that labeling of image 2D bounding boxes is fast and that open training sets for image object detections are available.

According to another aspect, the computer-implemented method may further comprise the following step carried out by the computer hardware components: determining a bounding box of the object in the image. The bounding box of the object may be determined based on the image.

According to another aspect, the coarse estimation may be determined further based on the bounding box.

According to another aspect, the coarse estimation is determined based on matching a measurement of the distance sensor with the bounding box.

According to another aspect, the distance is determined based on a hash table for the class of the object.

According to another aspect, the hash table comprises a correction for determining the distance based on the coarse estimation.

In another aspect, the present disclosure is directed at a computer system, said computer system comprising a plurality of computer hardware components configured to carry out several or all steps of the computer-implemented method described herein. The computer system can be part of a vehicle.

The computer system may comprise a plurality of computer hardware components (for example a processor, for example processing unit or processing network, at least one memory, for example memory unit or memory network, and at least one non-transitory data storage). It is understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example, using the processing unit and the at least one memory unit.

In another aspect, the present disclosure is directed at a vehicle comprising the computer system as described herein, a camera configured to acquire the image, and the distance sensor.

In another aspect, the present disclosure is directed at a non-transitory computer-readable medium comprising instructions for carrying out several or all steps or aspects of the computer-implemented method described herein. The computer-readable medium may be configured as: an optical medium, such as a compact disc (CD) or a versatile digital disk (DVD); a magnetic medium, such as a hard disk drive (HDD); a solid-state drive (SSD); a read-only memory (ROM), such as a flash memory; or the like. Furthermore, the computer-readable medium may be configured as data storage that is accessible via a data connection, such as an internet connection. The computer-readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
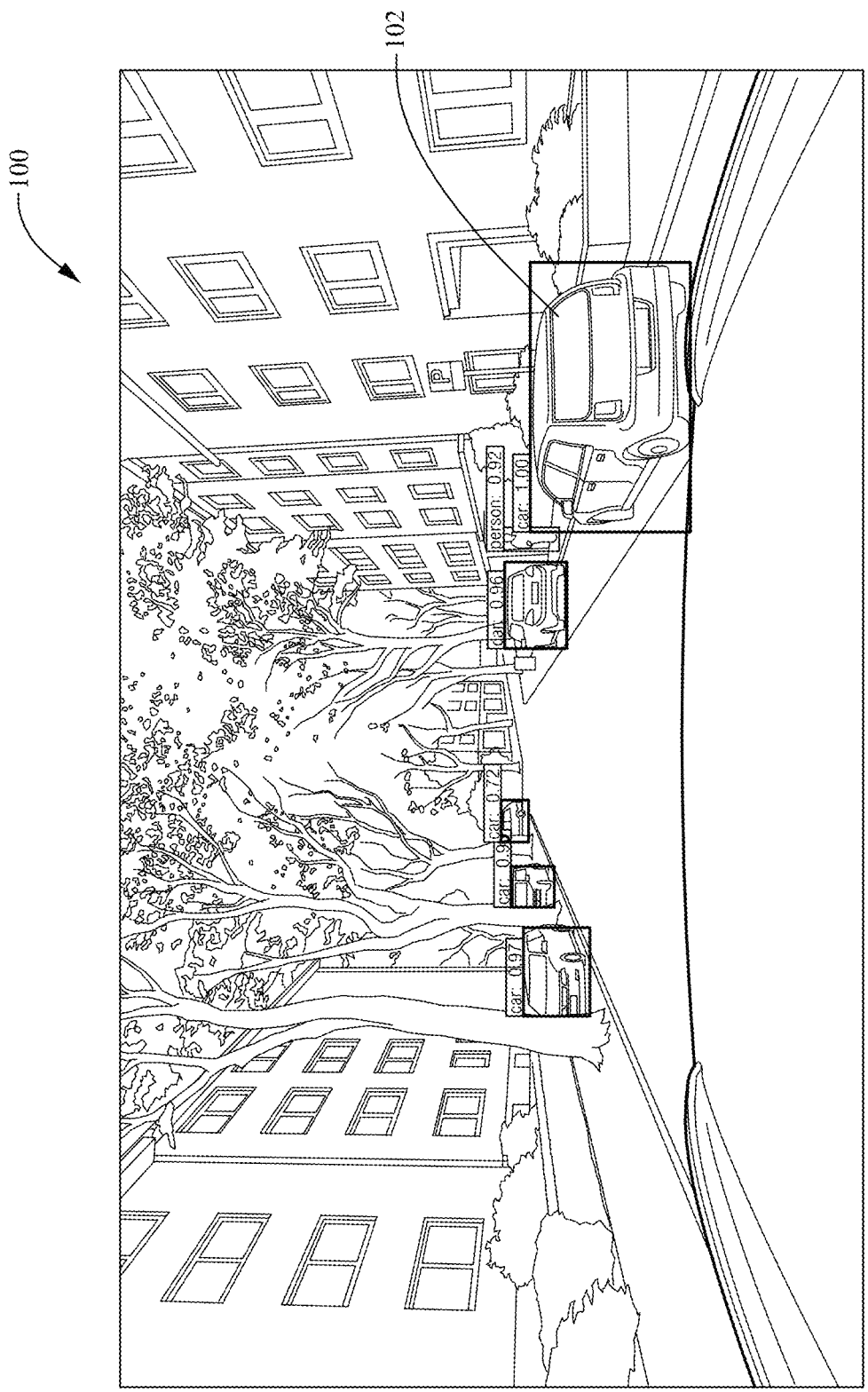
FIG. 1 an illustration of an image and corresponding bounding boxes.

It may be desirable for a self-driving (in other words: autonomous) car to be able to determine the distance to other objects and, after finding their placement, to determine a set of possible actions for the self-driving car. It is understood that different objects have different meaning or significance, and while some object classes may be ignored, localization of others may be needed to determine the best and most secure way to drive for the self-driving car.

Machine learning method may allow to accurately find the localization of objects of interest in a form of 2D (two-dimensional) bounding boxes on a camera image plane. Determining 2D bounding boxes may include:

1) determining coordinates (in the image) of bounding box surrounding an object;
2) determining a type of the object (for example, car, truck, pedestrian, construction vehicle, etc.); and
3) determining a certainty score (or a probability) of a detection.

Determining the 2D bounding boxes may be very efficient. 2D bounding box determination may work in real-time on embedded devices and may have very good accuracy distinguishing many classes. It is understood that the number of classes that are distinguished may depend on the training data. For example, up to 80 classes may be modeled.

However, plane camera representation as such may give no information on how far from the ego vehicle (on which the camera which acquires the image is provided) actually the objects of interest are and what their 3D (three-dimensional) positions are with respect to actual distance among them. According to various embodiments, interchangeable and reliable systems returning such information in real-time and in a very accurate way are provided.

According to various embodiments, quick and accurate construction of a representation allowing identification of places with relation to the ego vehicle of all objects of interests that were found by detection algorithm working on images may be provided. The architecture according to various embodiments may be applicable to various sensor setups.

According to various embodiments, distance-oriented objects description may be constructed by training of a machine learning method (for example, an artificial neural network, for example of an SSD type), together with an accurate method for reprojection (in other words: determining 3D coordinates based on the 2D coordinates which are projected on the image sensor by the camera) using 'sensor with depth' (for example radar, lidar, 3D camera, time of flight camera) onto Bird's Eye View (BEV) coordinate system of all objects of interest found in 2D plane camera view. Furthermore, according to various embodiments, a further correction may be provided by compensation of distances for objects, which may be implied by choosing an appropriate training strategy which relies on specifying objects positions (heading direction) and sizes (width, length) encapsulating them into training class types, making the classes more granular.

According to various embodiments, a coarse reprojection method may be provided, which approximates positioning of objects in the environment. Furthermore, a method to perform the training of ML (machine learning) method that is beneficial and allows to improve the overall accuracy of positions of reprojected objects may be provided.

To perform the reprojection itself, a sensor with depth or depth indicated from sensor implicitly (as mono/stereo camera depth) may be used. For example, the sensor may be a sensor lidar or radar sensor. The method for reprojecting using sensor with depth may make use of the inverted operations to those used when projecting, e.g., projecting 3D point cloud onto camera image. Moreover, a method to make an estimation of image point's depth may be provided since most likely looking at a specific point in image plane, it does not associate directly with any of projected points from sensor with depth (for example, because that point is missed because of sparsity of the sensor points).

To have reasonably accurate view of the scene and to be able to identify the location in BEV, e.g., giving the distance from ego to all objects of interest, it may be assumed that there is at least one 'sensor with depth' point projected onto camera view in proximity of each object's 2D bounding box detection on the image sample, where proximity may be understood as at least one projected sensor's point in each bounding box. For instance, if it is required to detect further objects, a sensor may be provided which is able to cast points as far and as dense as needed so there are close projected points to our objects of interest. Thus, a reasonably reflected environment including all objects of interest may be provided.

According to various embodiments, reprojection may start with finding each 2D bounding box center. Then, having the central points, for each central point, the k (with an integer number of k) nearest projected 'sensor with depth' points may be determined with an efficient method using k-d trees method. Then, the average of their depths may be taken as an estimated depth for the bounding box center. Using this depth, the center may be reprojected onto 3D using inverse operations to these used while projecting 'sensor with depth' points onto camera plane. Then, the center points (and/or the bounding boxes) may be projected onto Bird's Eye View.

However, after these steps, the obtained localization may be coarse. It may identify that in BEV the objects of interest occupy reprojected points but doesn't give an accurate representation of their positions.

From the information available with standard training of 2D bounding box detection neural networks, the type of an object may, and its probability of existence may be determined (for example using the machine learning method of SSD type). According to various embodiments, enhancing this information may be used to make the positioning (in other words: the determination of the position) more robust. This may be provided by specific way of training of the detection neural network (for example, the specific way of how the training classes are provided).

According to various embodiments, a specific division of objects into training classes (such as pedestrian, sedan car, bicycle, . . . ) may be provided, where it may be able to indicate fixed size for all objects in specific class. By specifying a class, it may be assumed that its elements are of similar sizes, so that each class contains elements with at least substantially the same or similar sizes (for example width and/or length).

According to various embodiments, the neural network (for example of an SSD type) may be trained, subdividing the main classes onto the classes with similar width and height, as truck_type_a and truck_type_b.

According to various embodiments, the orientation of objects may be determined. For the reprojection setup, discrete representation of orientation (for example, left, upper-left, upper, upper-right, right, bottom-right, bottom, bottom-left) may be used. However, it is understood that a more granular or a coarser representation may be used. The orientation may take a form of further subclass in the neural network. Then, for example, the class of an object may be "sedan_bottom_right" (e.g., a type of the object of class "sedan", and an orientation of the object of "bottom right").

Having the orientation and the type of an object, compensation may be provided to the reprojection of detection center from plane camera onto BEV. A default size value may be used for each class; for example, most sedan cars have similar sizes (looking from BEV we are interested in their width and height). Then, we a default orientation may be applied to the BEV bounding box with indication of its front.

According to various embodiments, the compensation for the reprojected center point may specified in a hash-table where for each class (as truck_type_a_front left), and a BEV correction vector may be provided. Using these vectors, while reprojecting each class, the compensation may be made. It is understood that the orientation with known front and back of an object which is obtained by the learning strategy according to various embodiments may be used for other purposes.

According to various embodiments, each identified 2D bounding box may be reprojected, achieving accurate description of the environment in BEV with positional knowledge of detected objects. The architecture according to various embodiments may be used for different sensor setups. In place of various kinds of lidar sensors resulting in different densities of point clouds, for providing depth, depth predicted from mono or stereo camera, or depth coming from a radar reading may be provided.

FIG. 1 shows an illustration 100 of an image and corresponding bounding boxes (for example bounding box 102).

Each bounding box may be related to a class of the object determined in the bounding box, and a confidence value (or probability value) indicating how reliable the determined information (bounding box including class is).

Figure 2:
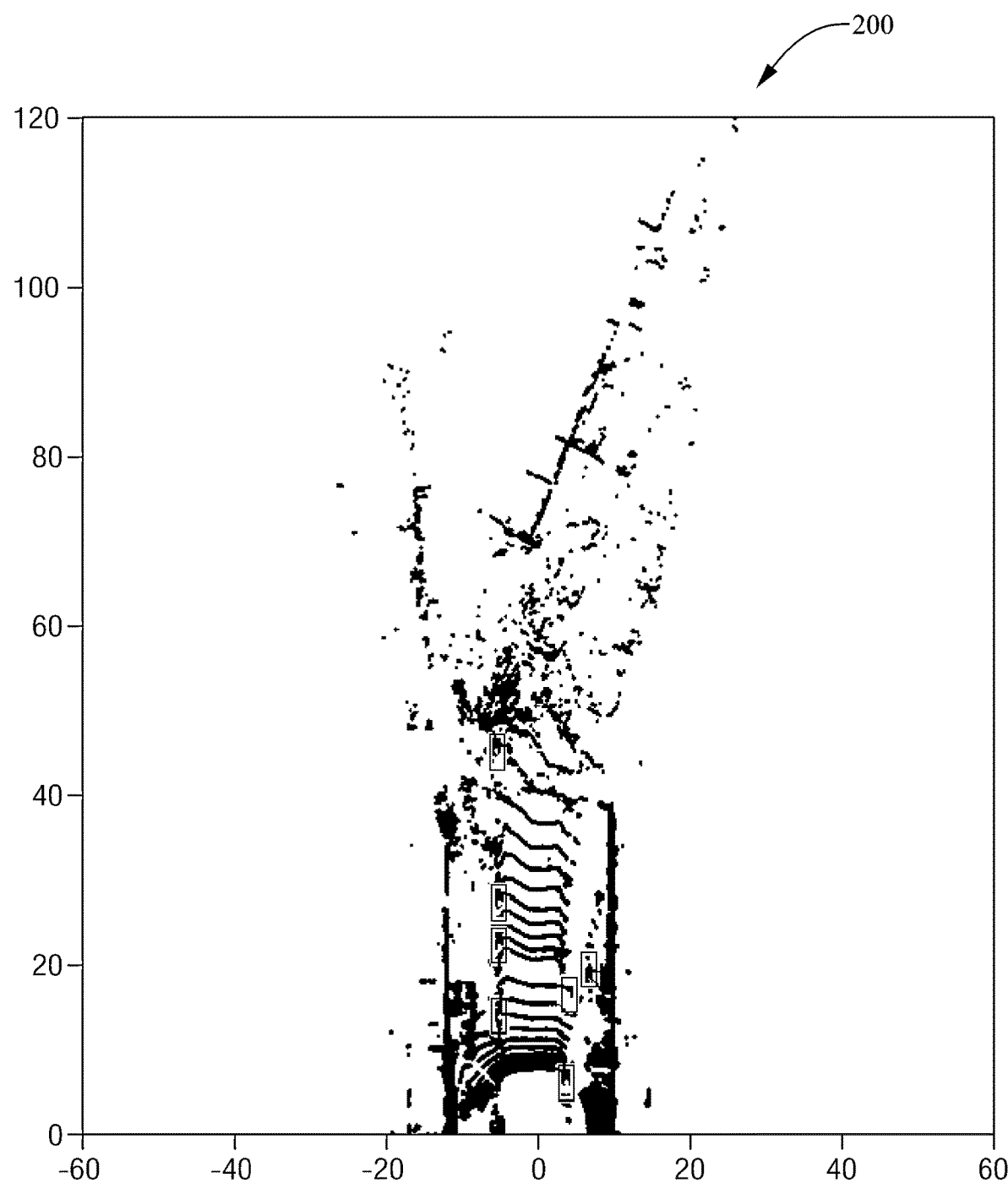
FIG. 2 an illustration of distances determined by a distance sensor in the scenario of FIG. 1.

FIG. 2 shows an illustration 200 of distances determined by a distance sensor in the scenario of FIG. 1.

Figure 3:
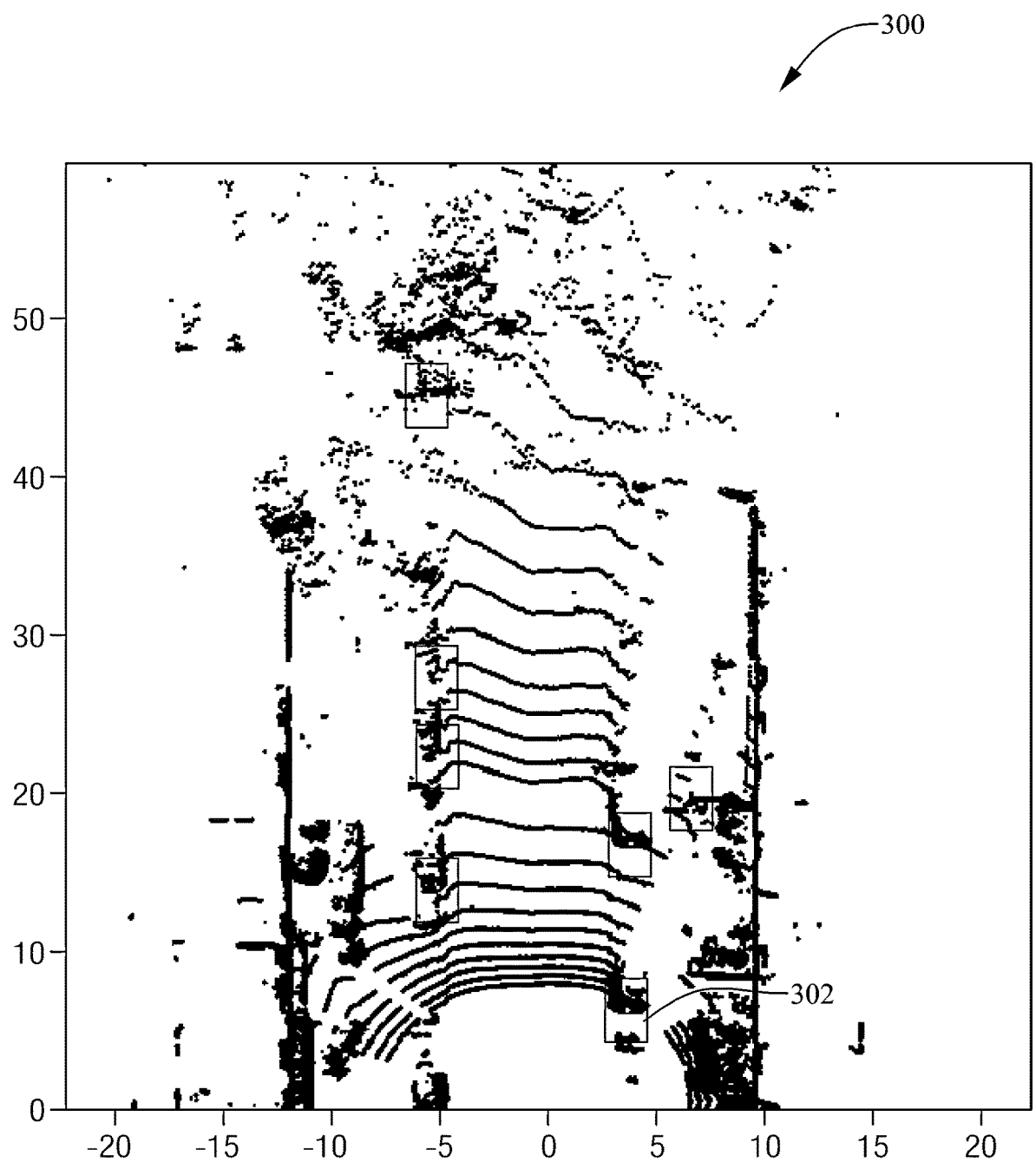
FIG. 3 an illustration of a coarse reprojection image, in which an object is illustrated.

FIG. 3 shows an illustration 300 of a coarse reprojection image, in which an object 302 is illustrated. The localization (bounding box and its direction) of an object may further be corrected applying a correction vector and heading information implied by identified class type.

Figure 4:
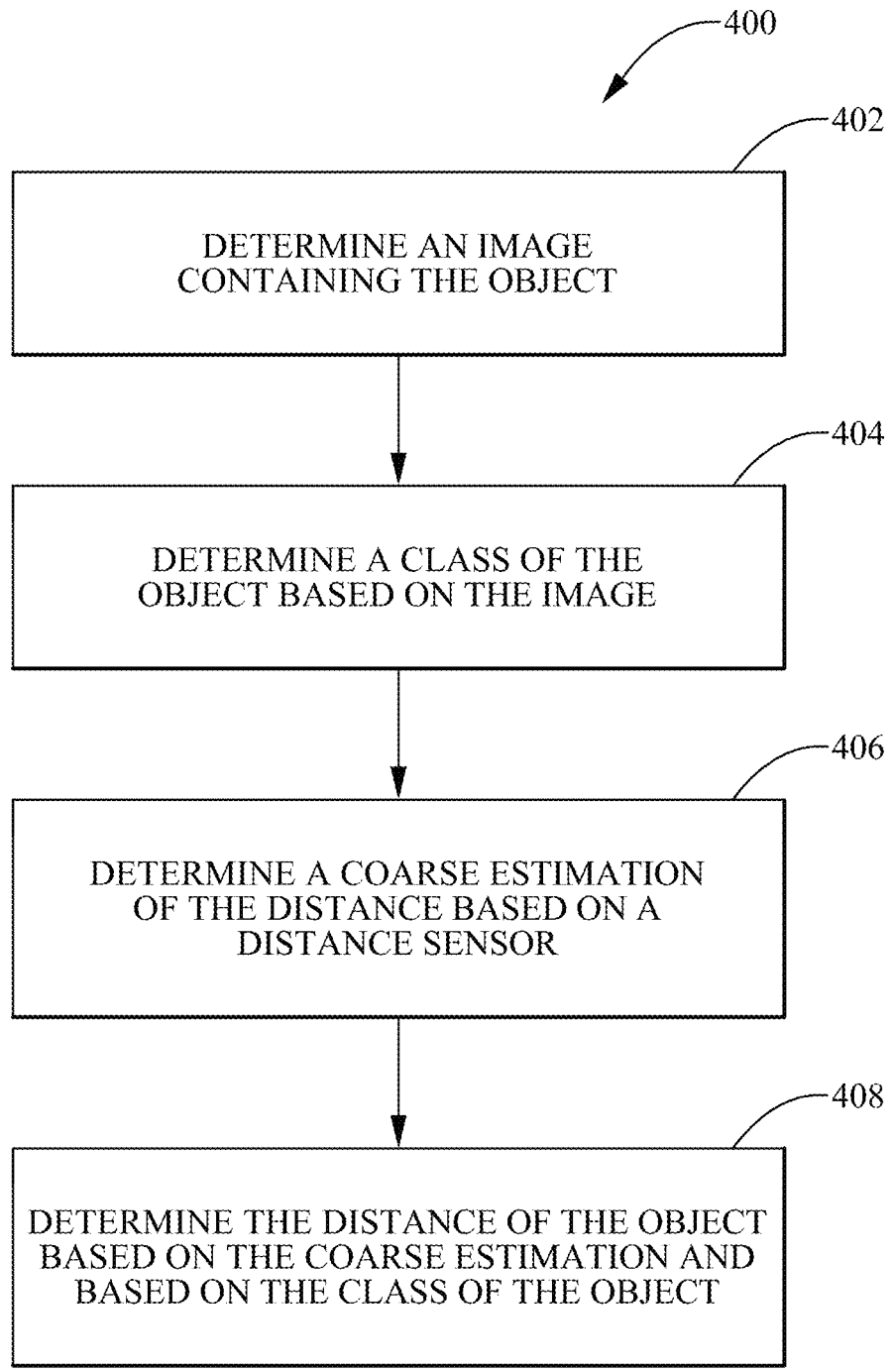
FIG. 4 a flow diagram illustrating a method for determining a distance of an object according to various embodiments.

FIG. 4 shows a flow diagram 400 illustrating a method for determining a distance of an object according to various embodiments. At 402, an image containing the object may be determined. At 404, a class of the object may be determined based on the image. At 406, a coarse estimation of the distance may be determined based on a distance sensor. At 408, the distance of the object may be determined based on the coarse estimation and based on the class of the object.

According to various embodiments, the class of the object may be selected from a plurality of traffic participant types.

According to various embodiments, the plurality of traffic participant types may include pedestrian, and/or bicycle, and/or car, and/or truck.

According to various embodiments, the class of the object may be selected from a plurality of orientations.

According to various embodiments, the plurality of orientations may include left, and/or upper-left, and/or upper, and/or upper right, and/or right, and/or bottom-right, and/or bottom, and/or bottom-left.

According to various embodiments, the class may be determined using an artificial neural network.

According to various embodiments, the artificial neural network may be of an SSD type.

According to various embodiments, the method may further include determining a bounding box of the object in the image.

According to various embodiments, the coarse estimation may be determined further based on the bounding box.

According to various embodiments, the coarse estimation may be determined based on matching a measurement of the distance sensor with the bounding box.

According to various embodiments, the distance may be determined based on a hash table for the class of the object.

According to various embodiments, the hash table may include a correction (for each class) for determining the distance based on the coarse estimation.

Each of the steps 402, 404, 406, 408 and the further steps described above may be performed by computer hardware components.

Figure 5:
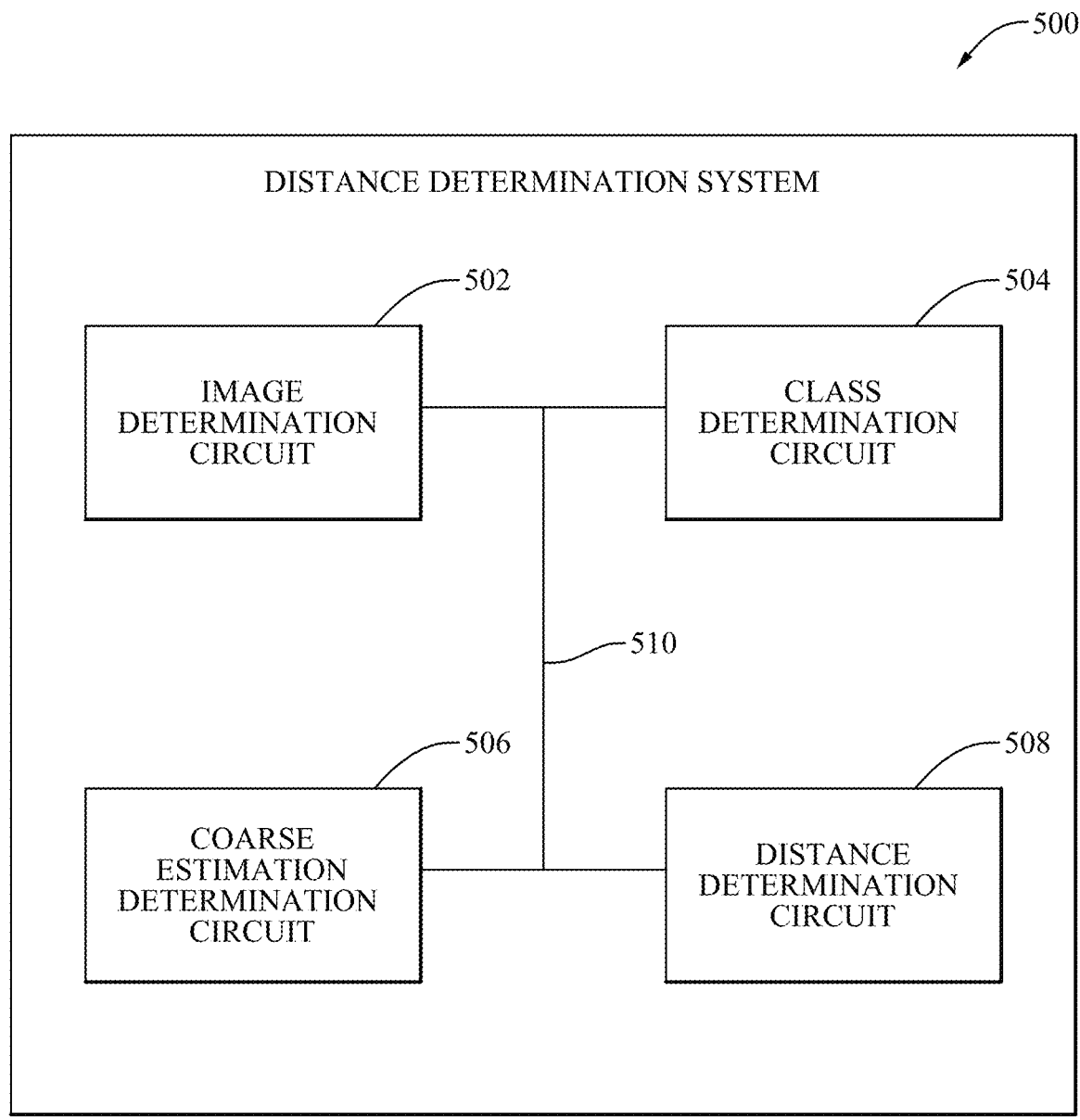
FIG. 5 a distance determination system according to various embodiments.

FIG. 5 shows a distance determination system 500 according to various embodiments. The distance determination system 500 may include an image determination circuit 502, a class determination circuit 504, a coarse estimation determination circuit 506, and a distance determination circuit 508.

The image determination circuit 502 may be configured to determine an image containing the object.

The class determination circuit 504 may be configured to determine a class of the object based on the image.

The coarse estimation determination circuit 506 may be configured to determine a coarse estimation of the distance based on a distance sensor.

The distance determination circuit 508 may be configured to determine the distance of the object based on the coarse estimation and based on the class of the object.

The image determination circuit 502, the class determination circuit 504, the coarse estimation determination circuit 506, and the distance determination circuit 508 may be coupled with each other, e.g., via an electrical connection 510, such as e.g., a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 6:
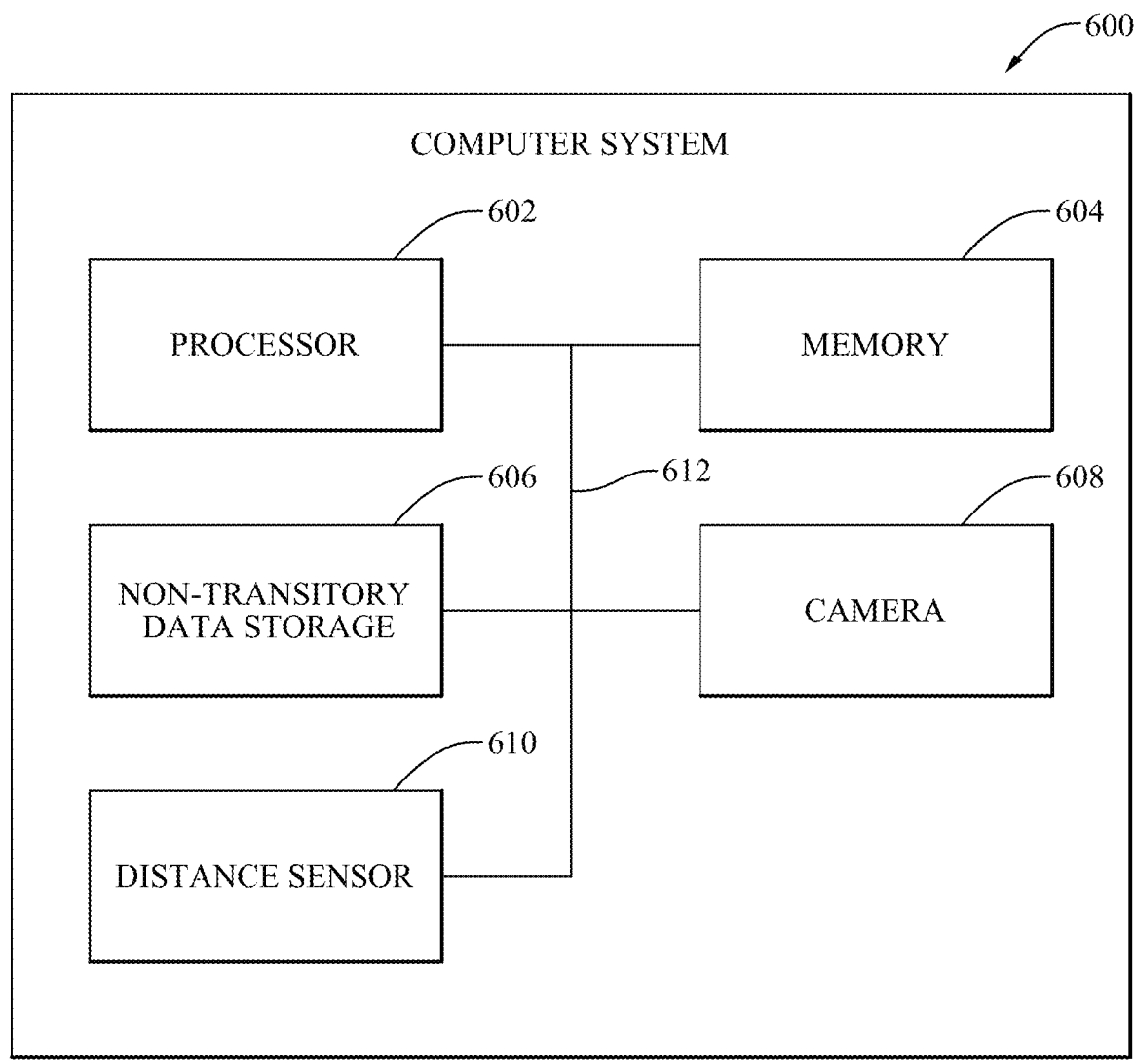
FIG. 6 a computer system with a plurality of computer hardware components configured to carry out steps of a computer implemented method for determining a distance of an object according to various embodiments.

FIG. 6 shows a computer system 600 with a plurality of computer hardware components configured to carry out steps of a computer-implemented method for determining a distance of an object according to various embodiments. The computer system 600 may include a processor 602, a memory 604, and a non-transitory data storage 606. A camera 608 and a distance sensor 610 may be provided as part of the computer system 600 (like illustrated in FIG. 6) or may be provided external to the computer system 600.

The processor 602 may carry out instructions provided in the memory 604. The non-transitory data storage 606 may store a computer program, including the instructions that may be transferred to the memory 604 and then executed by the processor 602. The camera 608 may be used for determining the image containing the object. The distance sensor 610 may be used to determine the coarse estimation.

The processor 602, the memory 604, and the non-transitory data storage 606 may be coupled with each other, e.g., via an electrical connection 612, such as e.g., a cable or a computer bus or via any other suitable electrical connection to exchange electrical signals. The camera 608 and/or the distance sensor 610 may be coupled to the computer system 600, for example, via an external interface, or may be provided as parts of the computer system (in other words: internal to the computer system, for example, coupled via the electrical connection 612).

The terms "coupling" or "connection" are intended to include a direct "coupling" (for example, via a physical link) or direct "connection" as well as an indirect "coupling" or indirect "connection" (for example, via a logical link), respectively.

It is understood that what has been described for one of the methods above may analogously hold true for the distance determination system 500 and/or for the computer system 600.

What is claimed is:

1. A computer-implemented method comprising:
    determining an image that contains an object;
    determining a class of the object based on the image;
    determining a bounding box of the object in the image;
    determining a coarse estimation of a distance to the object based on matching a measurement of a distance sensor with the bounding box; and
    determining the distance to the object based on the coarse estimation and based on the class of the object.

2. The computer-implemented method of claim 1, wherein the class of the object is selected from a plurality of traffic-participant types.

3. The computer-implemented method of claim 2, wherein the plurality of traffic-participant types includes at least two of a pedestrian, a bicycle, a car, or a truck.

4. The computer-implemented method of claim 1, wherein the class of the object is selected from a plurality of orientations.

5. The computer-implemented method of claim 4, wherein the plurality of orientations includes at least two of left, upper-left, upper, upper right, right, bottom-right, bottom, or bottom-left.

6. The computer-implemented method of claim 1, wherein the class is determined using an artificial neural network.

7. The computer-implemented method of claim 6, wherein the artificial neural network is of a single shot detector (SSD) type.

8. The computer-implemented method of claim 1, wherein the distance is determined based on a hash table for the class of the object.

9. The computer-implemented method of claim 8, wherein the hash table comprises a correction for determining the distance based on the coarse estimation.

10. A computer system comprising a processor configured to:
    determine an image that contains an object;
    determine a class of the object based on the image;
    determine a bounding box of the object in the image;
    determine a coarse estimation of a distance to the object based on matching a measurement of a distance sensor with the bounding box; and
    determine the distance to the object based on the coarse estimation and based on the class of the object.

11. The computer system of claim 10, wherein the class of the object is selected from a plurality of traffic-participant types.

12. The computer system of claim 11, wherein the plurality of traffic-participant types includes at least two of a pedestrian, a bicycle, a car, or a truck.

13. The computer system of claim 10, wherein the class of the object is selected from a plurality of orientations.

14. The computer system of claim 13, wherein the plurality of orientations includes at least two of left, upper-left, upper, upper right, right, bottom-right, bottom, or bottom-left.

15. The computer system of claim 10, wherein the class is determined using an artificial neural network.

16. The computer system of claim 10, wherein the computer system is installed in a vehicle that includes the distance sensor and a camera configured to acquire the image.

17. A non-transitory computer readable medium comprising instructions that, when executed, cause a processor to:
    determine an image that contains an object;
    determine a class of the object based on the image;
    determine a bounding box of the object in the image;
    determine a coarse estimation of a distance to the object based on matching a measurement of a distance sensor with the bounding box; and
    determine the distance to the object based on the coarse estimation and based on the class of the object.

* * * * *